(12) United States Patent
Kinoshita

(10) Patent No.: US 11,529,624 B2
(45) Date of Patent: Dec. 20, 2022

(54) HONEYCOMB STRUCTURE

(71) Applicant: NGK Insulators, Ltd., Nagoya (JP)

(72) Inventor: Takashi Kinoshita, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 174 days.

(21) Appl. No.: 16/359,132

(22) Filed: Mar. 20, 2019

(65) Prior Publication Data

US 2019/0299203 A1 Oct. 3, 2019

(30) Foreign Application Priority Data

Mar. 30, 2018 (JP) ............................. JP2018-066770

(51) Int. Cl.
| | |
|---|---|
| *B01J 35/04* | (2006.01) |
| *B01D 53/94* | (2006.01) |
| *F01N 3/28* | (2006.01) |
| *B01J 37/08* | (2006.01) |
| *B01J 37/02* | (2006.01) |

(52) U.S. Cl.
CPC .............. *B01J 35/04* (2013.01); *B01D 53/94* (2013.01); *B01J 37/0215* (2013.01); *B01J 37/08* (2013.01); *F01N 3/2821* (2013.01); *F01N 2330/38* (2013.01)

(58) Field of Classification Search
CPC ................................ F01N 2330/38; B01J 35/04
See application file for complete search history.

(56) References Cited

U.S. PATENT DOCUMENTS

| | | | |
|---|---|---|---|
| 9,188,044 B2 * | 11/2015 | Aoki | ........................ B01J 35/04 |
| 9,303,542 B2 * | 4/2016 | Aoki | ................... C04B 38/0009 |
| 11,020,733 B2 * | 6/2021 | Takamuro | ................ B01J 35/04 |

(Continued)

FOREIGN PATENT DOCUMENTS

| | | |
|---|---|---|
| JP | S62-266298 A1 | 11/1987 |
| JP | S63-2003 8 A | 1/1988 |

(Continued)

OTHER PUBLICATIONS

English language translation of JP S62-266298A Description, generated on Nov. 30, 2020 with Espacenet website (https://www.epo.org/searching-for-patents/technical/espacenet.html). Paragraph Numbers added by Examiner; instances of "(mm)" in paragraph 12 were read directly from the original document.*

(Continued)

*Primary Examiner* — Mark Ruthkosky
*Assistant Examiner* — Julia L Rummel
(74) *Attorney, Agent, or Firm* — Burr & Brown, PLLC

(57) ABSTRACT

A honeycomb structure includes a pillar-shaped honeycomb structure body which has porous partition walls disposed to surround a plurality of cells Among the partition walls surrounding one of the cells, each of the partition walls constituting two opposite sides of the cell sandwiched therebetween is provided with a projection which project to extend into the cell and which is continuously provided in a direction in which the cell extends, and the area S1 of one region of the cell divided by a virtual line that virtually connects distal ends of the two projections in a section of the honeycomb structure body, and the area S2 of the other region (S1≤S2) of the cell satisfy 70%≤S1/S2×100%.

4 Claims, 3 Drawing Sheets

(56) References Cited

U.S. PATENT DOCUMENTS

| 2014/0154144 A1* | 6/2014 | Aoki | B01J 35/002 |
| | | | 422/180 |
| 2014/0154145 A1* | 6/2014 | Aoki | B01J 35/0006 |
| | | | 422/180 |
| 2020/0230587 A1* | 7/2020 | Beall | B01D 46/2474 |

FOREIGN PATENT DOCUMENTS

| JP | 2013-056312 A | 3/2013 |
| JP | 2014-131795 A | 7/2014 |

OTHER PUBLICATIONS

Japanese Office Action (with English translation), Japanese Application No. 2018-066770, dated Sep. 28, 2021 (12 pages).

* cited by examiner

HONEYCOMB STRUCTURE

The present application is an application based on JP 2018-066770 filed on Mar. 30, 2018 with Japan Patent Office, the entire contents of which are incorporated herein by reference.

BACKGROUND OF THE INVENTION

Field of the Invention

The present invention relates to a honeycomb structure. More specifically, the present invention relates to a honeycomb structure which can be ideally used especially as a catalyst carrier adapted to load a catalyst for purifying exhaust gas.

Description of the Related Art

In recent years, the awareness of environmental issues has been increasing throughout society. Hence, in the field of technology for generating motive power by burning fuels, various technologies for removing harmful components, such as nitrogen oxides, from exhaust gas generated when a fuel is burnt have been developed. For example, various technologies for removing harmful components, such as nitrogen oxides, from the exhaust gas emitted from automobile engines have been developed. In general, when removing harmful components in exhaust gas, a catalyst is used to cause a harmful component to carry out a chemical reaction so as to change the harmful component into another component that is relatively harmless. As the catalyst carrier for loading a catalyst for purifying exhaust gas, a honeycomb structure is used.

Hitherto, as the honeycomb structure, there has been proposed a honeycomb structure provided with a honeycomb structure body which has porous partition walls defining a plurality of cells which serve as fluid through channels. As such a honeycomb structure, there has been proposed a honeycomb structure provided with fins projecting inward from the partition walls in order to increase the geometrical surface areas of the partition walls (see, for example, Patent Document 1).

[Patent Document 1] JP-A-S62-266298

SUMMARY OF THE INVENTION

According to the honeycomb structure described in Patent Document 1, the geometrical surface areas of the partition walls can be increased by the fins provided on the partition walls. However, placing the fins as described in Patent Document 1 involves many portions closed by the fins relative to the space used as the through channels in the cells, which easily leads to stagnation of a gas flow. This has caused a problem in that a gas flow is locally concentrated in one cell, leading to deterioration of emissions, especially under high load in a driving mode of an automobile.

The present invention has been made in view of the problem with the prior art described above. The present invention provides a honeycomb structure that can be ideally used especially as a catalyst carrier that loads a catalyst for purifying exhaust gas. A honeycomb structure which, in particular, suppresses the deterioration of emissions and is expected to improve purification performance is provided.

According to the present invention, a honeycomb structure described below is provided.

According to a first aspect of the present invention, a honeycomb structure is provided including:

a pillar-shaped honeycomb structure body which has porous partition walls disposed to surround a plurality of cells that provide fluid through channels extending from a first end face to a second end face; and a circumferential wall disposed to surround the partition walls, wherein, among the partition walls surrounding one of the cells, each of the partition walls constituting two opposite sides of the cell sandwiched therebetween is provided with a projection which project to extend into the cell and which is continuously provided in a direction in which the cell extends, the two projections which project into the cell are disposed at positions where the interior of the cell is divided into two by a virtual line that virtually connects distal ends of the two projections in a section of the honeycomb structure body, the section being orthogonal to the direction in which the cell extends, and when the area of one region of the cell divided by the virtual line is denoted by S1, and the area of the other region of the cell is denoted by S2, Equation (1) given below is satisfied:

$$70\% \leq S1/S2 \times 100\%. \qquad \text{Equation (1):}$$

(where the relationship of $S1 \leq S2$ is indicated in the above Equation (1).)

According to a second aspect of the present invention, the honeycomb structure according to the first aspect is provided, wherein each of the projections is disposed such that a side surface of the projection forms an angle of 50 to 90 degrees with respect to a surface of each of the partition walls.

According to a third aspect of the present invention, the honeycomb structure according to the first or second aspects is provided, wherein the thickness of each of the partition walls is 0.05 to 0.153 mm.

According to a fourth aspect of the present invention, the honeycomb structure according to any one of the first to third aspects is provided, wherein a height H1 of each of the projections and a cell pitch H2 of the honeycomb structure body satisfy the relationship of Equation (2) given below:

$$15\% \leq H1/H2 \times 100\% \leq 40\%. \qquad \text{Equation (2):}$$

According to a fifth aspect of the present invention, the honeycomb structure according to any one of the first to fourth aspects is provided, wherein a width W1 of each of the projections is 0.0127 to 0.203 mm.

The honeycomb structure in accordance with the present invention has the projections provided such that the projections project into the cells, thus making it possible to increase the geometrical surface areas of the partition walls by the projections. Further, since among the partition walls surrounding one cell, the projections are provided only on the partition walls that constitute the two sides opposing each other of the cell sandwiched therebetween, an excessive increase of the quantity of the projections can be suppressed, and the occurrence of the stagnation of a gas flow can be effectively suppressed. The honeycomb structure in accordance with the present invention provides effect for suppressing the deterioration of emissions and for improving purification performance.

DETAILED DESCRIPTION OF THE PRESENT INVENTION

The following will specifically describe embodiments of the present invention with reference to the accompanying drawings. The present invention is not limited to the following embodiments. It should be understood that the present invention also covers changes, improvements or the like added as appropriate to the following embodiments on the basis of common knowledge of those skilled in the art, within the spirit and scope of the present invention.

(1) Honeycomb Structure

Figure 1:
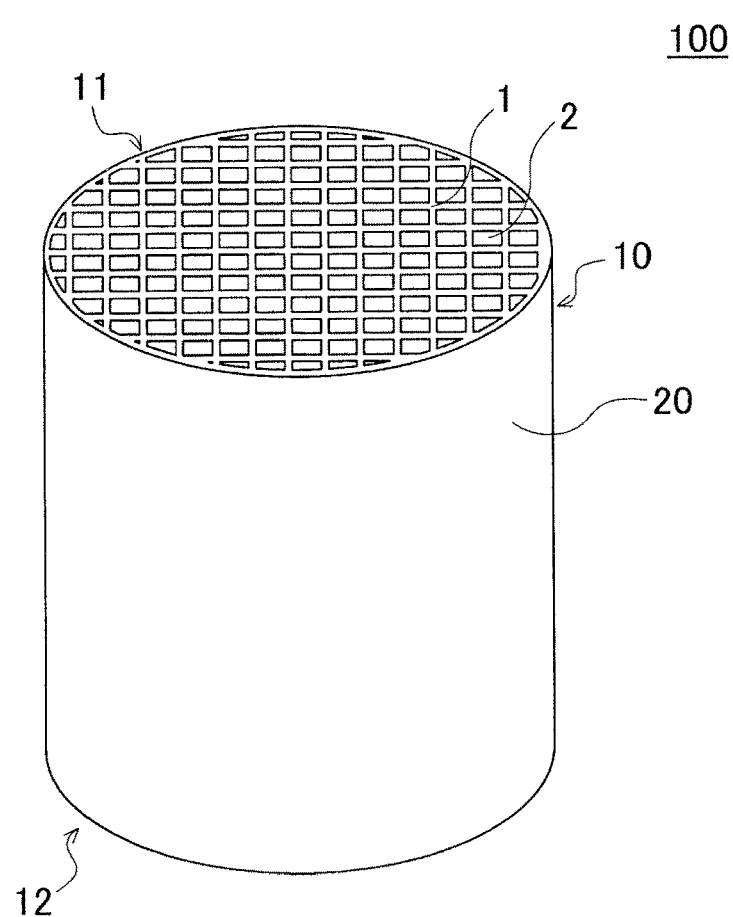
FIG. 1 is a perspective view schematically showing an embodiment of a honeycomb structure in accordance with the present invention.
Figure 2:
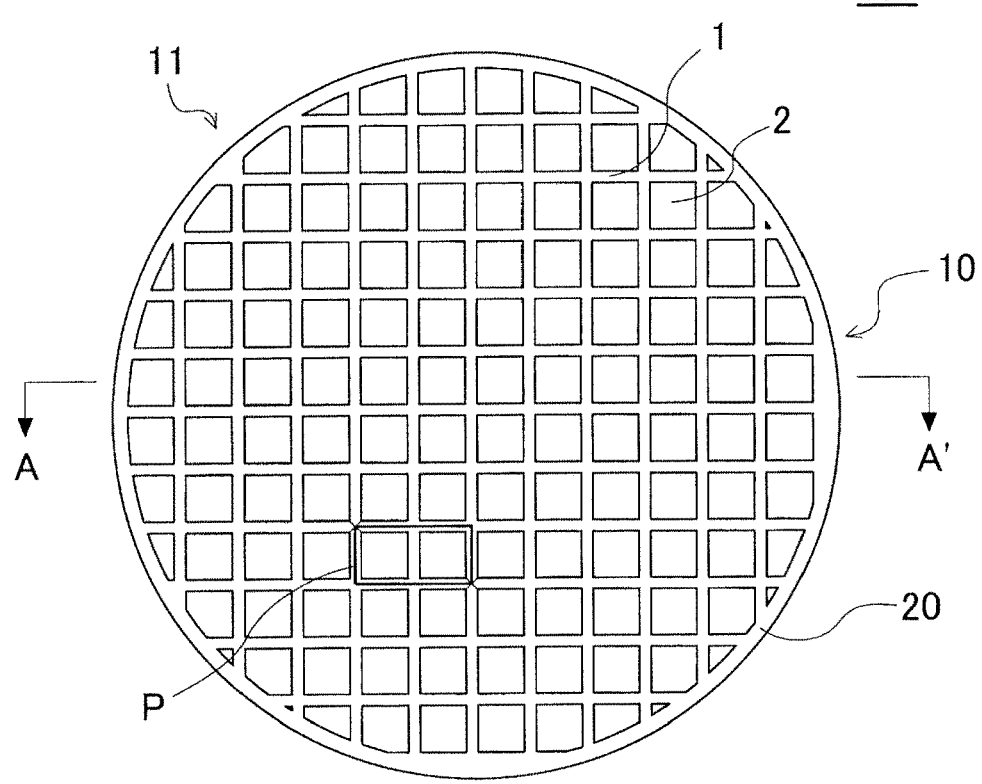
FIG. 2 is a plan view schematically showing an inflow end face of the embodiment of the honeycomb structure in accordance with the present invention.
Figure 3:
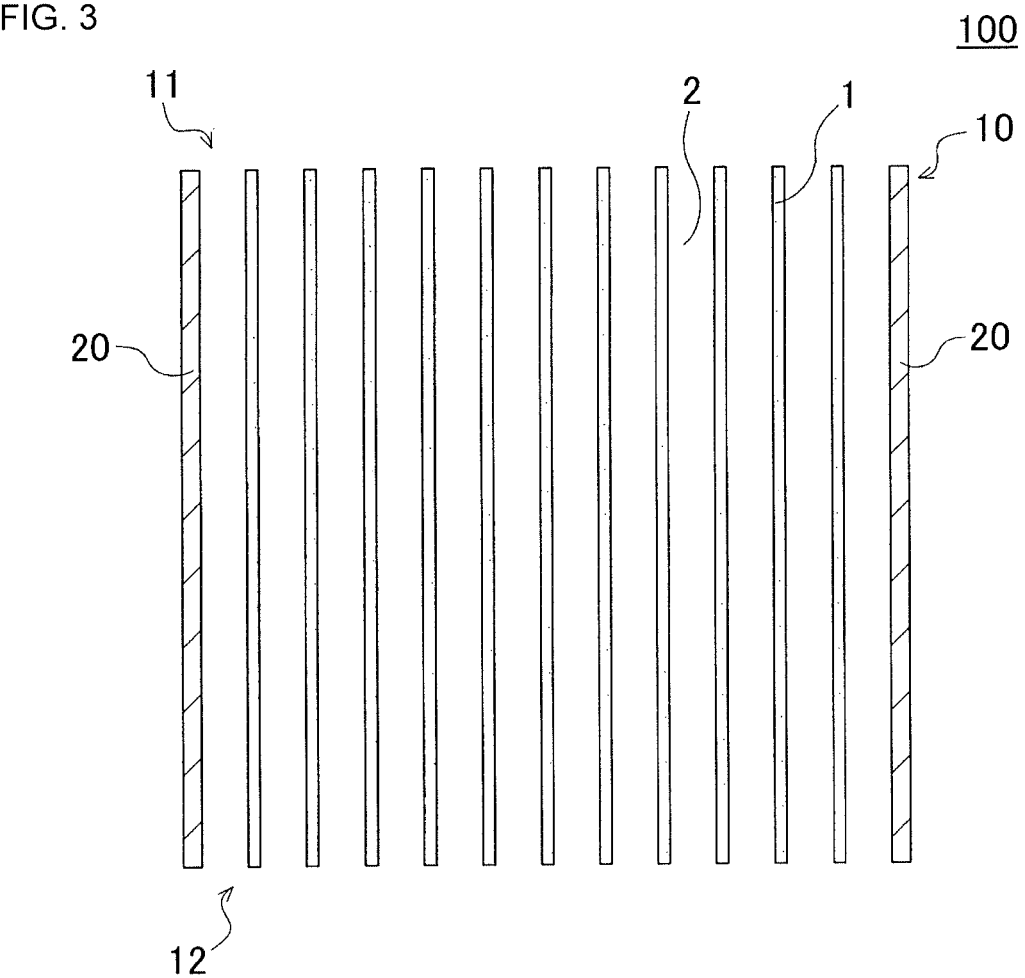
FIG. 3 is a sectional view schematically showing a section taken on line A-A' of FIG. 2.
Figure 4:
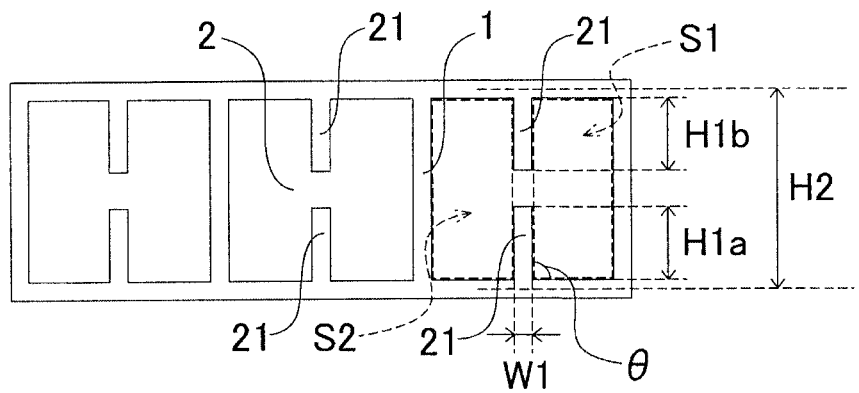
FIG. 4 is a plan view schematically showing, in an enlarged view, a part (region P) of the inflow end face shown in FIG. 2.

An embodiment of the honeycomb structure in accordance with the present invention is a honeycomb structure 100 shown in FIG. 1 to FIG. 4. The honeycomb structure 100 has a pillar-shaped honeycomb structure body 10. FIG. 1 is a perspective view schematically showing the embodiment of the honeycomb structure in accordance with the present invention. FIG. 2 is a plan view schematically showing an inflow end face of the embodiment of the honeycomb structure in accordance with the present invention. FIG. 3 is a sectional view schematically showing a section taken on line A-A' of FIG. 2. FIG. 4 is a plan view schematically showing, in an enlarged view, a part (region P) of the inflow end face shown in FIG. 2.

The honeycomb structure body 10 has porous partition walls 1 which are disposed to surround a plurality of cells 2, which provide fluid through channels extending from a first end face 11 to a second end face 12, and a circumferential wall 20 which are disposed to surround the partition walls 1. Further, as shown in FIG. 4, the partition walls 1 have projections 21, 21, which project to extend into each of the cells 2 and which are continuously provided in the direction in which the cells 2 extend. Especially, in the honeycomb structure 100 according to the present embodiment, among the partition walls 1 that surround one of the cells 2, the projections 21 are provided, one each, on each of the partition walls 1 that constitute two sides opposing each other of the cell 2 sandwiched therebetween. In the present specification, the term "two opposing sides" means two sides which have a parallel positional relationship and two sides which have a positional relationship in which the angle formed by the two sides is 10 degrees or less.

In a section that is orthogonal to the direction in which the cells 2 of the honeycomb structure body 10 extend, the two projections 21, 21 projecting into the cell 2 are disposed at positions where the interior of the cell 2 is divided into two by a virtual line that virtually connects the distal ends of the two projections 21, 21. Further, the honeycomb structure 100 of the present embodiment is configured such that, if the area of one region of the cell 2, which is divided by the virtual line, is denoted by S1 and the area of the other region of the cell 2 is denoted by S2, then Equation (1) given below is satisfied. More specifically, according to the honeycomb structure 100 of the present embodiment, the value determined by "S1/S2×100%" ranges from 70% to 100%. Of the cells 2, those having the projections 21 projecting into the cells 2 will be hereinafter referred to as "the particular cells" in some cases.

$$70\% \leq S1/S2 \times 100\%. \qquad \text{Equation (1):}$$

(where the relationship of S1≤S2 is indicated in the above Equation (1).)

The honeycomb structure 100 has the projections 21 which are provided, projecting into the particular cells 2, and which satisfy the predetermined condition. Hence, the honeycomb structure 100 can increase the geometrical surface area of the partition walls 1. In addition, since among the partition walls 1 surrounding one of the cells 2, the projections 21 are provided only on the partition walls 1 that constitute the two sides opposing each other, of the particular cell 2 sandwiched therebetween, an excessive increase of the quantity of the projections 21 can be suppressed, and the occurrence of the stagnation of a gas flow can be effectively suppressed. Thus, the honeycomb structure 100 provides the effect for suppressing the deterioration of emissions and for improving purification performance.

If the value of "S1/S2×100%" is below 70%, then the stagnation of a gas flow tends to occur in the cell 2. In such a cell, the local concentration of the gas flow takes place, which inconveniently leads to the deterioration of emissions especially under high load in the driving mode of an automobile. The value of "S1/S2×100%" is preferably 80% or more, further preferably 90% or more, and particularly preferably 95% or more.

In the honeycomb structure 100, the partition walls 1 have the projections 21, as described above. Hence, when the honeycomb structure 100 is loaded with a catalyst, the honeycomb structure 100 provides a larger catalyst loading area because of the presence of projections 21 than in a honeycomb structure without the projections 21. As a result, the characteristic of contact between the catalyst and exhaust gas is enhanced, leading to improved performance for purifying the exhaust gas.

The areas S1 and S2 of the two regions divided by the virtual line that virtually connects the distal ends of the two projections 21, 21 projecting into the cell 2 can be determined according to the following method. First, the first end face 11 of the honeycomb structure 100 is imaged using a projector (e.g. a profile projector made by Mitutoyo Corporation). Next, the obtained image is subjected to an image analysis using image analysis software (e.g. image analysis software made by Mitutoyo Corporation) so as to determine the areas S1 and S2 of the two regions divided by the foregoing virtual line. When determining the areas S1 and S2, the areas of the two projections 21, 21 projecting into the cell 2 are not to be included. If the areas of the two regions divided by the foregoing virtual line are different, then the region that has a smaller area is defined as a region having the area S1. The distal end (the apex) of each of the projections 21 is to be at a position that is the farthest in the extending direction of the projection 21 from the base of the projection 21 in a section orthogonal to the extending direction of the cell 2. Heights H1a, H1b of the projections 21, an angle θ formed by the side surfaces of the projections 21, and a width W1 of the projections 21, which will be discussed later, can be also measured using the images captured by the foregoing projector. For each measurement, captured images are preferably enlarged by desired magnification ratios, as appropriate.

The honeycomb structure 100 preferably includes the particular cells 2 by 50% or more in the total cells 2. For example, the ratio of the particular cells 2 in the total cells 2 (Value calculated by an equation: (Number of the particular cells 2/Total number of the cells 2)×100%) is preferably 65% to 99%, and particularly preferably 80% to 99%. When the ratio of the particular cells 2 to the total cells 2 is in the foregoing ranges, higher exhaust gas purification performance is displayed. The ratio of the particular cells 2 in the total cells 2 may be set to 100%. If the ratio is below the foregoing lower limit value, then the contact area reduces and the temperature raising effect by the fins cannot be obtained and the purification performance may deteriorate.

Each of the projections 21 is preferably disposed such that a side surface of the projection 21 forms an angle θ of 40 to 100 degrees with respect to a surface of each of the partition walls 1. Hereinafter, the angle θ formed by the side surface of the projection 21 with respect to the surface of the partition wall 1 will be referred to simply as "the angle θ formed by the side surface of the projection 21" in some cases. The angle θ formed by the side surface of the projection 21 is particularly preferably 75 to 90 degrees. When the angle θ formed by the side surface of the projection 21 is within the foregoing ranges, the possibility of a catalyst accumulating in a thick layer at the base of the projection 21 when applying the catalyst (when coating the catalyst) will be minimized. This makes it possible to increase the surface area after applying the catalyst (after coating the catalyst), resulting in improved exhaust gas purification performance. If the angle θ formed by the side surface of the projection 21 is below the lower limit value of the foregoing ranges, then the volume of the projection 21 will increase in the case where the heights of the projections 21 are adjusted to be the same while changing the angle θ. As a result, the heat capacity of the honeycomb structure 100 will increase and it will take longer time for the catalyst to reach an activation temperature, leading to a possibility of the deterioration of the exhaust gas purification performance. If the angle θ formed by the side surface of the projection 21 exceeds the upper limit value of the foregoing ranges, then much catalyst may accumulate at the base of the projection 21 when coating the catalyst. In other words, a thick layer of the catalyst (a catalyst layer) tends to be formed at the base of the projection 21. Hence, the catalyst of a lower layer portion (a portion close to the partition wall) of the catalyst layer may not be effectively used. The angle θ formed by the side surface of the projection 21 is defined as the angle formed by the tangent of the side surface of the projection 21 at the position that is half the height of the projection 21 and the extended line of the bottom of the projection 21 in the section that is orthogonal to the extending direction of the cells 2. The angle θ formed by the side surface of the projection 21 means the clockwise angle, as observed from the inflow end face side, among the angles formed by the surfaces of the partition walls 1 and the side surfaces of the projections 21. The angle θ formed by the side surface of the projection 21 is defined as the angle on the space side in the cell 2, as observed from the inflow end face side, among the angles formed by the surfaces of the partition walls 1 and the side surfaces of the projections 21. The angle θ formed by one side surface of the projection 21 and the angle θ formed by the other side surface of the projection 21 may be the same or different. If the angle θ formed by one side surface of the projection 21 and the angle θ formed by the other side surface of the projection 21 are different, then both angles θ are preferably within the foregoing value ranges.

The height H1 (height H1a and height H1b in FIG. 4) of the projection 21 and the cell pitch H2 of the honeycomb structure body 10 preferably satisfy the relationship of Equation (2) given below. Equation (2) given below is a general equation, in which the height of the projection 21 is denoted by H1. Accordingly, as shown in FIG. 4, if the heights of the projections 21, 21 provided on the partition walls 1 disposed opposing each other are denoted by the height H1a and the height H1b, then the values of H1a and H1b are substituted into H1 of Equation (2) given below to determine whether Equation (2) given below is satisfied.

$$15\% \le H1/H2 \times 100\% \le 40\%. \qquad \text{Equation (2):}$$

If the value of "H1/H2×100%" in Equation (2) is below 15%, then the space in the cell 2 will not be sufficiently divided by the projections 21, thus causing a gas flow to be locally concentrated in one cell. This may lead to the deterioration of emissions especially under high load in a driving mode of an automobile. If the value of "H1/H2× 100%" in Equation (2) exceeds 40%, then it is undesirable regarding the increase of pressure loss. The value of "H1/H2×100%" is particularly preferably 15% to 30%. The heights H1a, H1b of the projections 21 mean the shortest distance from the apexes of the projections 21 (the highest points of the projections 21) to the bases of the projections 21 in the section that is orthogonal to the extending direction of the cells 2. Further, the cell pitch H2 of the honeycomb structure body 10 means the distance obtained by adding a value that is half the thickness of each of the partition walls 1 to the distance between the partition walls 1 that are disposed opposing each other.

The width W1 of each of the projections 21 is preferably 0.0127 to 0.203 mm, and particularly preferably 0.0381 to 0.1524 mm. If the width W1 of the projections 21 is below the lower limit value of the foregoing ranges, then it is undesirable, because the machining cost of dies and the difficulty of manufacture will increase. If the width W1 of the projections 21 exceeds the upper limit value of the foregoing ranges, then it is undesirable, because the purification efficiency will decrease and the pressure loss will increase. The value of the width W1 of the projections 21 is to be a value measured at the position of the base of each of the projections 21.

Figure 5:
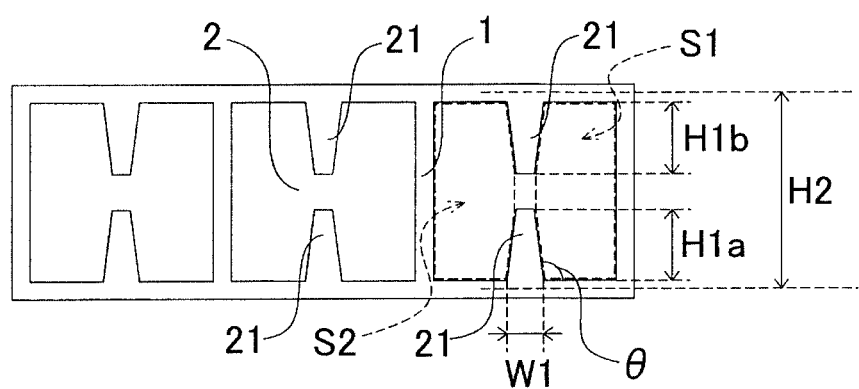
FIG. 5 is a plan view schematically showing, in an enlarged view, a part of an inflow end face of another embodiment of the honeycomb structure in accordance with the present invention.
Figure 6:
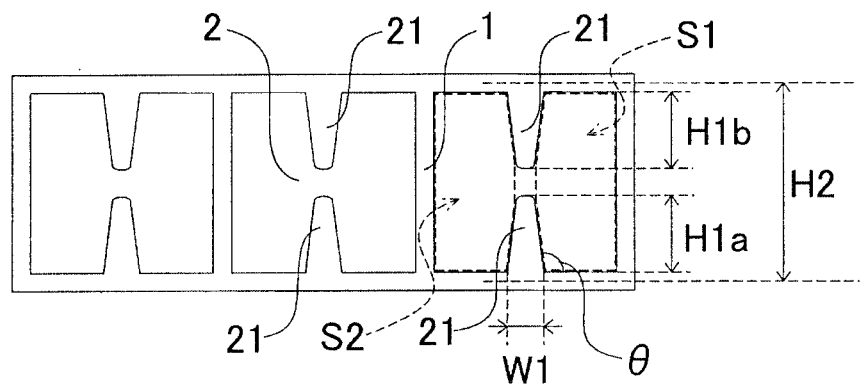
FIG. 6 is a plan view schematically showing, in an enlarged view, a part of an inflow end face of yet another embodiment of the honeycomb structure in accordance with the present invention.

There are no particular restrictions on the shape of each of the projections 21 in the section that is orthogonal to the extending direction of the cells 2. For example, the shape of each of the projections 21 may be a rectangular shape that perpendicularly extends from the surface of the partition wall 1, as shown in FIG. 4, or the shape of each of the projections 21 may be a trapezoidal shape having the surface side of the partition walls 1 as the base thereof, as shown in FIG. 5. Further, although not shown, the shape of each of the projections may be, for example, a triangular shape, a semicircular shape or a semi-elliptical shape. Further, for example, each of the projections 21 may be formed to have a trapezoidal shape with the surface side of the partition wall 1 as the base thereof, the distal end of the projection 21 having an arc shape, as shown in FIG. 6. FIG. 5 is a plan view schematically showing, in an enlarged view, a part of an inflow end face of another embodiment of the honeycomb structure in accordance with the present invention. FIG. 6 is a plan view schematically showing, in an enlarged view, a part of an inflow end face of yet another embodiment of the honeycomb structure in accordance with the present invention.

The thickness of the partition walls 1 is preferably 0.05 to 0.153 mm, and particularly preferably 0.05 to 0.110 mm. If the thickness of the partition walls 1 is below the lower limit value, then the mechanical strength may be insufficient. If the thickness of the partition walls 1 exceeds the upper limit value, then the pressure loss of the honeycomb structure 100 may increase. The thickness of the partition walls 1 means the thickness of a portion thereof where the projections 21 are not provided.

There are no particular restrictions on the material of the partition walls 1. The main component is preferably, for example, ceramic. More specifically, the material is preferably at least one selected from a group including silicon carbide, a silicon-silicon carbide based composite material, cordierite, mullite, alumina, aluminum titanate, silicon nitride, and a silicon carbide-cordierite based composite material.

There are no particular restrictions on the shape of the cells 2 insofar as the shape is a polygon having two opposing sides. The shape of the cells 2 may be, for example, a tetragon, a pentagon, a hexagon, an octagon or other polygons. In the honeycomb structure body 10, the cells 2 having different shapes may be mixed. For example, tetragonal cells 2 and hexagonal or octagonal cells 2 may mixedly exist in one honeycomb structure body 10. In the present specification, "the shape of the cells 2" means the shape of the cells without the projections 21. Further, "the shape of the cells 2 being a polygon" means a concept that includes a shape of the cells 2 equivalent to a polygon.

The circumferential wall 20 is a wall provided to surround the partition walls 1. The circumferential wall 20 may be formed integrally with the partition walls 1.

The thickness of the circumferential wall 20 is preferably 0.1 to 0.6 mm, and particularly preferably 0.1 to 0.3 mm. If the thickness of the circumferential wall 20 is below the lower limit value, then the mechanical strength deteriorates in some cases. If the thickness of the circumferential wall 20 exceeds the upper limit value, then a large space must be secured to accommodate the honeycomb structure 100 in some cases.

The cell density of the honeycomb structure 100 is preferably 31 to 155 cells/cm$^2$, and particularly preferably 43 to 148 cells/cm$^2$. If the cell density is below the lower limit value, then the strength may not be maintained. If the cell density exceeds the upper limit value, then the pressure loss of the honeycomb structure 100 may increase.

(2) Manufacturing Method of the Honeycomb Structure

The honeycomb structure in accordance with the present invention can be manufactured by a method that includes a honeycomb forming process and a firing process. The following will describe these processes.

(2-1) Honeycomb Forming Process

In the present process, a ceramic forming raw material that contains a ceramic raw material is used to form a honeycomb formed body having the partition walls provided to surround a plurality of cells that provide fluid through channels.

The ceramic raw material contained in the ceramic forming raw material is preferably at least one selected from a group including a cordierite forming raw material, cordierite, silicon carbide, a silicon-silicon carbide based composite material, mullite, and aluminum titanate. The cordierite forming raw material is a ceramic raw material prepared to have a chemical composition in which silica ranges from 42 to 56 mass %, alumina ranges from 30 to 45 mass %, and magnesia ranges from 12 to 16 mass %. Further, the cordierite forming raw material is fired to become cordierite.

Further, the ceramic forming raw material can be prepared by blending a dispersing medium, an organic binder, an inorganic binder, a pore former, a surfactant or the like into the foregoing ceramic raw material. The composition ratio of each raw material is not particularly restricted, and a composition ratio is preferably determined according to the structure, the material and the like of the honeycomb structure to be manufactured.

In the forming process of the ceramic forming raw material, the ceramic forming raw material is first kneaded to make a kneaded material, and the obtained kneaded material is formed into a honeycomb shape. As the method for kneading the ceramic forming raw material to form the kneaded material, a method using, for example, a kneader, a vacuum pugmill or the like, may be used. As the method for forming the kneaded material into a honeycomb formed body, a publicly known forming method, such as extrusion, injection molding or the like, can be used.

More specifically, a method for forming the honeycomb formed body by extrusion with a die can be cited as an ideal example. A material for the die is preferably cemented carbide, which is wear-resistant.

A die fabricated as described below is preferably used. First, a die (a conventional die) used to fabricate a conventional publicly known honeycomb structure having no projections is prepared. Then, from a slit (a gap for forming partition walls) of the conventional die, a region that is complementary with a projection (a region which will become a projection by the entry of the kneaded material) is formed toward the die main body side of the conventional die. The foregoing "region that is complementary with a projection" can be formed by, for example, carrying out electric discharge machining or the like on the die main body of the conventional die. Thus, a predetermined die can be fabricated.

By using the die described above, a honeycomb formed body having the projections that satisfy the conditions of the honeycomb structure in accordance with the present invention can be easily fabricated.

There are no particular restrictions on the shape of the honeycomb formed body, and the shape may be a round pillar shape, an elliptical pillar shape, or a polygonal pillar shape with an end face formed to have "a square, rectangular, triangular, pentagonal, hexagonal, octagonal shape or the like".

Further, the honeycomb formed body obtained after the forming process described above can be dried. There are no particular restrictions on a drying method. The drying method may be, for example, hot-air drying, microwave drying, dielectric drying, reduced-pressure drying, vacuum drying, or freeze drying. Among these, the dielectric drying, the microwave drying or the hot-air drying is preferably used alone or in combination.

(2-2) Firing Process

Next, the honeycomb formed body is fired to fabricate a honeycomb fired body. The honeycomb formed body is fired in order to sinter the forming raw material constituting the honeycomb formed body so as to densify the forming raw material thereby to secure a predetermined strength. The firing conditions (temperature, time, atmosphere and the like) differ according to the type of forming raw material, so that appropriate conditions are to be selected according to the type of forming raw material. For example, if a cordierite forming raw material is used, then the firing temperature is preferably 1410 to 1440° C. Further, regarding the firing time, the maximum temperature holding time is preferably 4 to 8 hours. As a firing apparatus, an electric furnace, a gas furnace or the like can be used. The honeycomb fired body obtained as described above can be used as the honeycomb structure of the present invention. The manufacturing method of the honeycomb structure may further include a circumferential coating process described below.

(2-3) Circumferential Coating Process

In the present process, a circumferential coating material is applied to the circumference of the obtained honeycomb fired body to form the circumferential wall. The circumferential wall may be formed to be integral with the partition walls when fabricating the honeycomb formed body. Forming the circumferential wall by the additional circumferential coating process makes it possible to prevent the honeycomb structure from being cracked when an external force is applied to the honeycomb structure.

The circumferential coating material may be obtained by, for example, adding an additive material, such as an organic binder, a foamable resin or a dispersing agent, to an inorganic raw material, such as an inorganic fiber, colloidal silica, clay, or SiC particles, adding water to the mixture, and then kneading the mixture. A method for applying the circumferential coating material includes a method for coating by a rubber spatula or the like while rotating "a cut honeycomb fired body" on a potter's wheel.

EXAMPLES

The following will further specifically describe the present invention by examples; however, the present invention is not limited by these examples.

Example 1

In Example 1, a forming raw material for fabricating the honeycomb structure was first prepared. More specifically, a binder, a surfactant, a pore former, and water were added to a ceramic raw material to make the forming raw material. As the ceramic raw material, kaolin, talc and alumina, which are cordierite forming raw materials, were used.

Next, the obtained forming raw material was kneaded by a kneader, and then soil kneading was performed by a vacuum pugmill to make a kneaded material. Next, the obtained kneaded material was extrusion-molded by using a die to make a honeycomb formed body. The die used was a die in which a region that is complementary with a projection (a region which will become a projection by the entry of the kneaded material) is formed. After the honeycomb formed body was fired, the thickness of the partition wall thereof was 0.09 mm, and the cell density was 62 cells/cm². The shape of the cells of the honeycomb formed body was tetragon. The honeycomb formed body was round pillar-shaped. The diameter of each end face of the round pillar-shaped honeycomb formed body was set such that the diameter became 103 mm after the firing process. Further, the length of the honeycomb formed body in the direction in which the cells extend was set such that the length became 84 mm after the firing process. As the foregoing die, a die which had been designed such that the honeycomb structure fabricated thereby satisfied the conditions indicated in Table 1 was used.

Subsequently, the honeycomb formed body was dried to obtain a honeycomb dried body. In the drying process, microwave drying was carried out first, and then, hot-air drying was carried out for two hours with hot air at a temperature of 120° C. Subsequently, both end portions of the honeycomb dried body were cut.

Subsequently, the obtained honeycomb dried body was degreased. The degreasing was carried out for five hours at 450° C. Then, the degreased honeycomb dried body was fired to obtain a honeycomb fired body. The firing was carried out in the atmosphere for seven hours at 1425° C. The temperature raising time from 1200 to 1425° C. was set to five hours. Thus, the honeycomb structure of Example 1 was fabricated.

As shown in FIG. 4, the honeycomb structure of Example 1 had the projection 21 formed on each of the partition walls 1 constituting the opposing two sides of the cell 2, the section of which has a tetragonal shape, being sandwiched between the opposing two sides. In other words, according to the honeycomb structure of Example 1, the number of the projections 21 per the cell 2 was two pieces per cell. The number of the projections per cell is shown in the column "Q'ty of projections (pcs/cell)" of Table 1.

In the honeycomb structure of Example 1, a height H1 of the projections was 0.28 mm. An angle θ formed by a side surface of each of the projections was 90 degrees. A width W1 of each of the projections was 0.127 mm. Further, in the honeycomb structure of Example 1, a cell pitch H2 of the honeycomb structure body was 1.27 mm. Therefore, the value of "H1/H2×100%" was 22%. The height H1 of the projection, the angle θ formed by a side surface of the projection, the width W1 of the projection, and the cell pitch H2 were determined by imaging a first end face of the honeycomb structure by using a profile projector made by Mitutoyo Corporation and subjecting the obtained image to an image analysis using image analysis software made by Mitutoyo Corporation. For each measurement, captured images were enlarged by desired magnification ratios, as appropriate, when performing the measurement. In the image analysis, the images captured by the profile projector were subjected to binarization processing and each measurement and the measurement results thereof were verified by using the measurement function of the image analysis software. The results are shown in Table 1.

Further, by using the images captured by the foregoing profile projector, the areas S1 and S2 of the two regions divided by a virtual line that virtually connects the distal ends of the two projections that project into a cell were determined. Then, based on the determined values of S1 and S2, the value of "S1/S2×100% (where S1≤S2)" was calculated. In the honeycomb structure of Example 1, the value of "S1/S2×100%" was 70%. The results are shown in Table 1.

Further, on the fabricated honeycomb structure, the thickness (mm) of the partition wall and the cell density (cells/cm²) were measured using the profile projector and the image analysis software described above. The results are shown in Table 1.

TABLE 1

| | Comp. Example 1 | Example 1 | Example 2 | Example 3 | Example 4 | Example 5 | Example 6 |
|---|---|---|---|---|---|---|---|
| Thickness of partition wall (mm) | 0.09 | 0.09 | 0.09 | 0.09 | 0.09 | 0.09 | 0.09 |
| Cell density (No. of cells/cm$^2$) | 62 | 62 | 62 | 62 | 62 | 62 | 62 |
| Cell pitch H2 (mm) | 1.27 | 1.27 | 1.27 | 1.27 | 1.27 | 1.27 | 1.27 |
| Height H1 of projection (mm) | 0.28 | 0.28 | 0.28 | 0.28 | 0.28 | 0.28 | 0.28 |
| Q'ty of projections (pcs/cell) | 2 | 2 | 2 | 2 | 2 | 2 | 2 |
| Angle formed by projection side surface $\theta$(°) | 90 | 90 | 90 | 40 | 50 | 90 | 100 |
| H1/H2 × 100% | 22 | 22 | 22 | 22 | 22 | 22 | 22 |
| Width W1 of projection (mm) | 0.127 | 0.127 | 0.127 | 0.127 | 0.127 | 0.127 | 0.127 |
| S1/S2 × 100% | 60% | 70% | 100% | 100% | 100% | 100% | 100% |
| Pressure loss (kPa) | 2.10 | 1.80 | 1.80 | 2.00 | 1.90 | 1.75 | 1.80 |
| Determination of pressure loss | NG | OK | OK | OK | OK | OK | OK |
| Bag emission (g/mile) | 0.025 | 0.018 | 0.018 | 0.020 | 0.019 | 0.015 | 0.018 |
| Determination of bag emission | NG | OK | OK | OK | OK | OK | OK |
| Overall determination | NG | OK | OK | OK | OK | OK | OK |

On the honeycomb structure of Example 1, the measurement of pressure loss and the measurement of bag emission were carried out according to the methods described below. The measurement results and the determination results of the pressure loss, and the measurement results and the determination results of the bag emission are shown in Table 1. Further, based on the determination results, overall determinations described below were carried out. The determinations are shown in Table 1.

(Pressure Loss)

On the fabricated honeycomb structure, the pressure loss was measured by using a large wind tunnel testing machine. At this time, the gas temperature was set to 25° C., and the gas flow rate was set to 10 Nm$^3$/min. The evaluation criteria were established such that 2.00 kPa or less was "OK" and over 2.00 kPa was "NG." This is because output deteriorates if the pressure loss exceeds 2.00 kPa.

(Bag Emission)

First, a test based on LA-4 mode of American Federal Test Procedure (hereinafter referred to as "the LA-4 test" in some cases) was conducted on the fabricated honeycomb structure according to the following method. First, the partition walls of the honeycomb structure were loaded with a catalyst (three-way catalyst) of 190 g/L. The honeycomb structure loaded with the catalyst was subjected to 12-hour aging at 950° C. by using an electric furnace. Then, the honeycomb structure loaded with the catalyst was mounted at a position below the floor level of a vehicle of 2400 cc displacement and subjected to the LA-4 test. In the LA-4 test, the direct modal mass was measured for each exhaust gas component by using an exhaust gas measurement device (Model "MEXA-7400" made by HORIBA Corporation). Further, the emission amount of HC as a typical exhaust gas component was measured. The space velocity of the exhaust gas in the LA-4 test was approximately 10000 (1/hr) (high flow rate). If the emission amount of HC at the bag emission measurement was 0.020 g/mile or less, then the test result was "OK," and if the emission amount thereof exceeded 0.020 g/mile, then the test result was "NG." If the evaluation is "OK," then it is considered that the evenly applied catalyst leads to higher purification performance, since the catalyst is effectively used for purifying the exhaust gas.

(Overall Determination)

Based on the determinations of the pressure loss and the determinations of the bag emission, overall determinations were carried out according to the following determination criteria. If the determination of the pressure loss and the determination of the bag emission were both "OK," then the overall determination was "OK," and all other cases were "NG."

Examples 2 to 14 and Comparative Example 1

Honeycomb structures that are the same as the honeycomb structure of Example 1 except for the thickness of the partition walls and the configuration of the projections as shown in Table 1 and Table 2 were fabricated according to the same method. The measurement of the pressure loss and the measurement of the bag emission were carried out on the honeycomb structures of Examples 2 to 14 and Comparative example 1 according to the same method as that of Example 1. The results are shown in Table 1 and Table 2.

TABLE 2

| | Example 7 | Example 8 | Example 9 | Example 10 | Example 11 | Example 12 | Example 13 | Example 14 |
|---|---|---|---|---|---|---|---|---|
| Thickness of partition wall (mm) | 0.09 | 0.165 | 0.09 | 0.09 | 0.09 | 0.09 | 0.09 | 0.09 |
| Cell density (No. of cells/cm$^2$) | 62 | 62 | 62 | 62 | 62 | 62 | 62 | 62 |
| Cell pitch H2 (mm) | 1.27 | 1.27 | 1.27 | 1.27 | 1.27 | 1.27 | 1.27 | 1.27 |
| Height H1 of projection (mm) | 0.28 | 0.28 | 0.15 | 0.19 | 0.51 | 0.55 | 0.55 | 0.28 |
| Q'ty of projections (pcs/cell) | 2 | 2 | 2 | 2 | 2 | 2 | 2 | 2 |
| Angle formed by projection side surface$\theta$ (°) | 90 | 90 | 90 | 90 | 90 | 90 | 90 | 90 |
| H1/H2 × 100% | 22 | 22 | 12 | 15 | 40 | 43 | 43 | 22 |
| Width W1 of projection (mm) | 0.127 | 0.127 | 0.127 | 0.127 | 0.127 | 0.127 | 0.010 | 0.229 |
| S1/S2 × 100% | 100% | 100% | 100% | 100% | 100% | 100% | 100% | 100% |
| Pressure loss (kPa) | 1.75 | 2.00 | 1.60 | 1.75 | 1.95 | 2.00 | 1.80 | 2.00 |
| Determination of pressure loss | OK | NG | OK | OK | OK | OK | OK | OK |
| Bag emission (g/mile) | 0.015 | 0.020 | 0.020 | 0.015 | 0.013 | 0.014 | 0.020 | 0.020 |
| Determination of bag emission | OK | OK | OK | OK | OK | OK | OK | OK |
| Overall determination | OK | OK | OK | OK | OK | OK | OK | OK |

(Results)

As shown in Table 1 and Table 2, the honeycomb structures of Examples 1 to 14 had lower pressure losses and lower emission amounts of HC at the bag emission than those of the honeycomb structure of Comparative example 1. This proves that the honeycomb structures of Examples 1 to 14 can suppress the deterioration of emissions while suppressing an increase in the pressure loss.

The honeycomb structure in accordance with the present invention can be used as an exhaust gas purifying catalyst carrier for purifying exhaust gas.

DESCRIPTION OF REFERENCE NUMERALS

1: partition wall; 2: cell; 10: honeycomb structure body; 11: first end face; 12: second end face; 20: circumferential wall; 21: projection; 100: honeycomb structure; H1$a$, H1$b$: height (the height of the projection); H2: cell pitch; S1, S2: area; W1: width (the width of the projection); and θ: angle (the angle formed by a side surface of the projection)

What is claimed is:

1. A honeycomb structure comprising:

a pillar-shaped honeycomb structure body which has porous partition walls disposed to surround a plurality of cells that provide fluid through channels extending from a first end face to a second end face; and a circumferential wall disposed to surround the partition walls, wherein, among the partition walls surrounding one of the cells, each of two of the partition walls constituting two opposite sides of the cell sandwiched therebetween is provided with a projection which projects to extend into the cell and which is continuously provided in a direction in which the cell extends, only two projections are included in each cell that is provided with projections, the two projections which project into the cell are disposed at positions where the interior of the cell is divided into two by a virtual line that virtually connects distal ends of the two projections in a section of the honeycomb structure body, the section being orthogonal to the direction in which the cell extends, in a case where the area of one region of the cell divided by the virtual line is denoted by S1, the area of the other region of the cell is denoted by S2, and S1≤S2, Equation (1) given below is satisfied:

$$70\% \leq S1/S2 \times 100\%, \qquad \text{Equation (1):}$$

wherein a height H1 of each of the projections and a cell pitch H2 of the honeycomb structure body satisfy the relationship of Equation (2) given below:

$$15\% \leq H1/H2 \times 100\% \leq 40\%; \qquad \text{Equation (2):}$$

wherein a width W1 of each of the projections is 0.0127 to 0.203 mm; and wherein a cell density of the honeycomb structure is 31 to 155 cells/cm$^2$.

2. The honeycomb structure according to claim 1, wherein each of the projections is disposed such that a side surface of the projection forms an angle of 50 to 90 degrees with respect to a surface of each of the partition walls.

3. The honeycomb structure according to claim 1, wherein the thickness of each of the partition walls is 0.05 to 0.153 mm.

4. The honeycomb structure according to claim 2, wherein the thickness of each of the partition walls is 0.05 to 0.153 mm.

* * * * *